Dec. 17, 1929.　　　C. C. PINCKNEY　　　1,740,117
WELDING APPARATUS
Filed Nov. 28, 1927　　　4 Sheets-Sheet 1
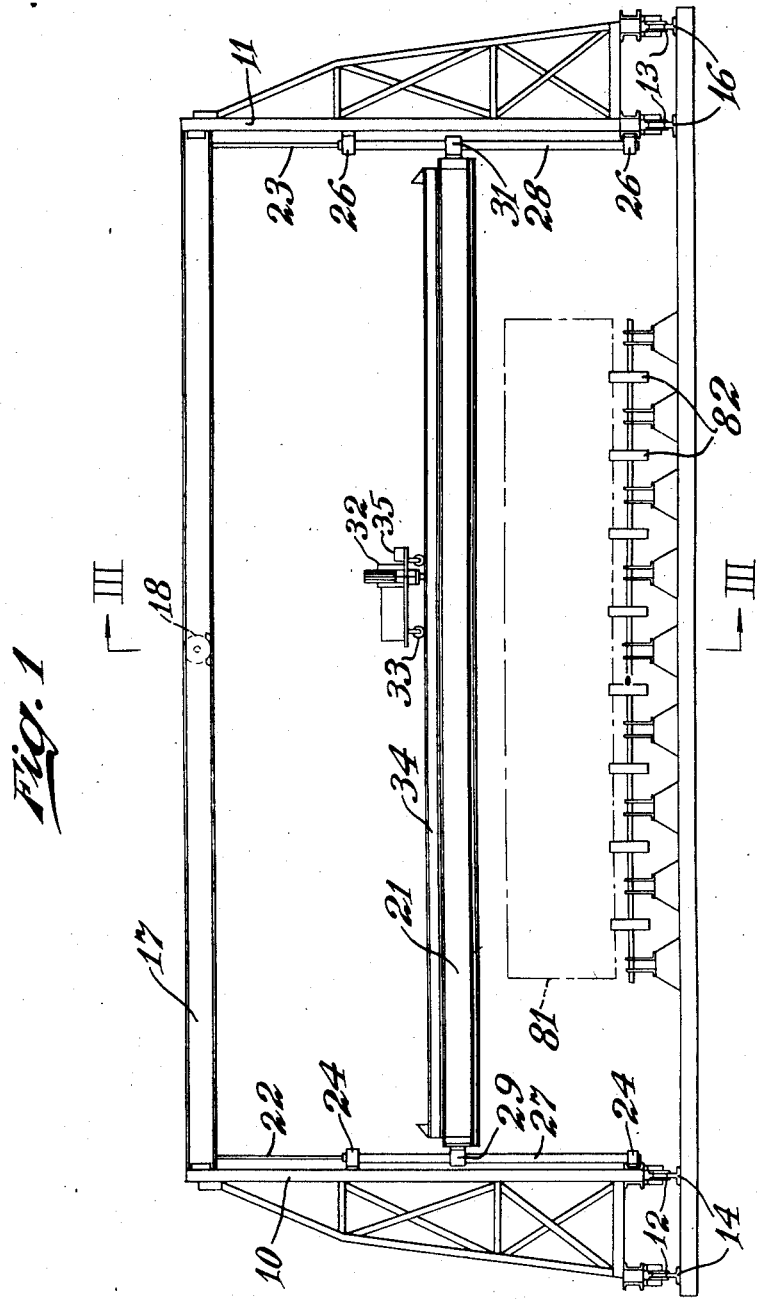
Inventor
C. C. Pinckney
By
Attorney

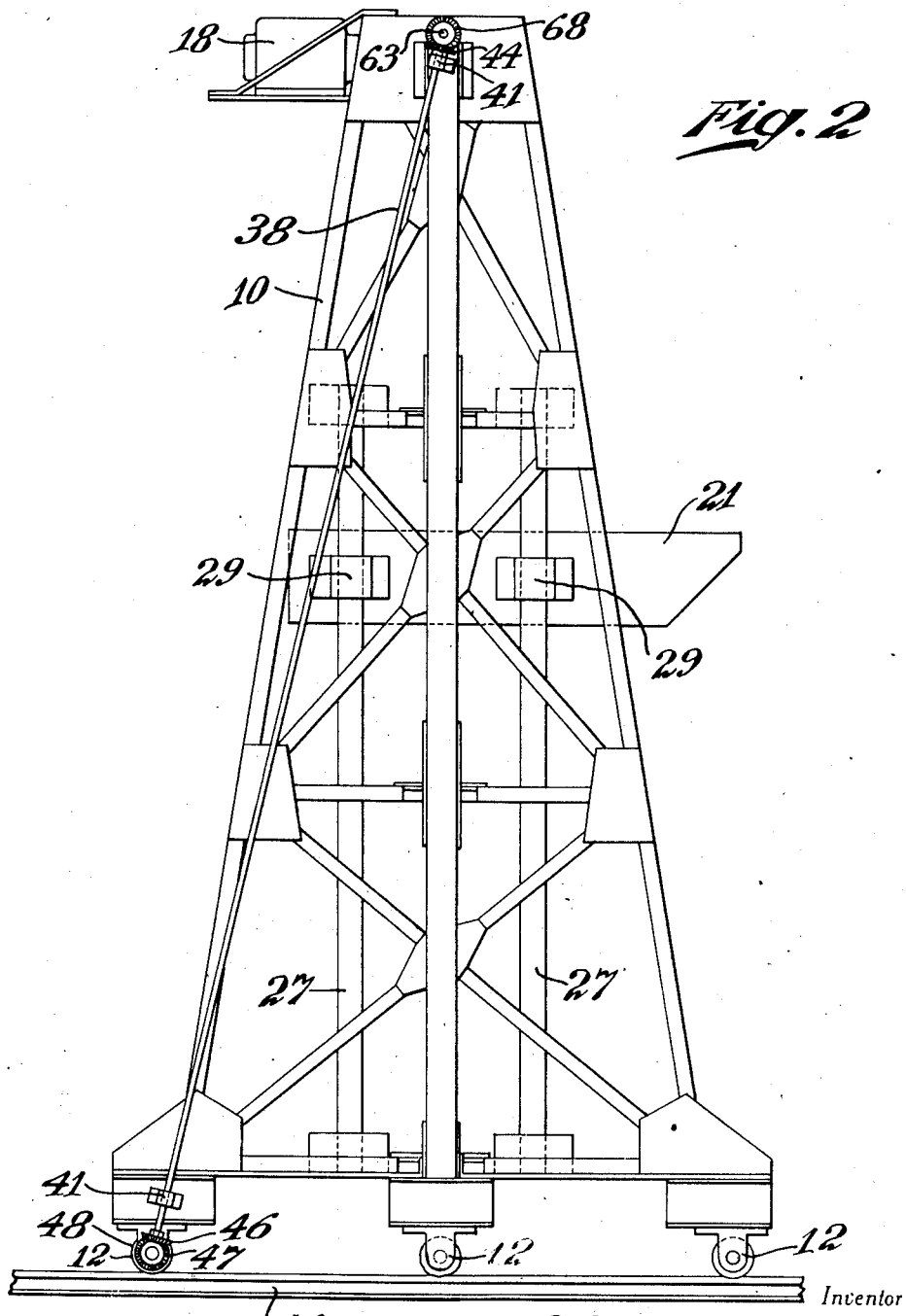

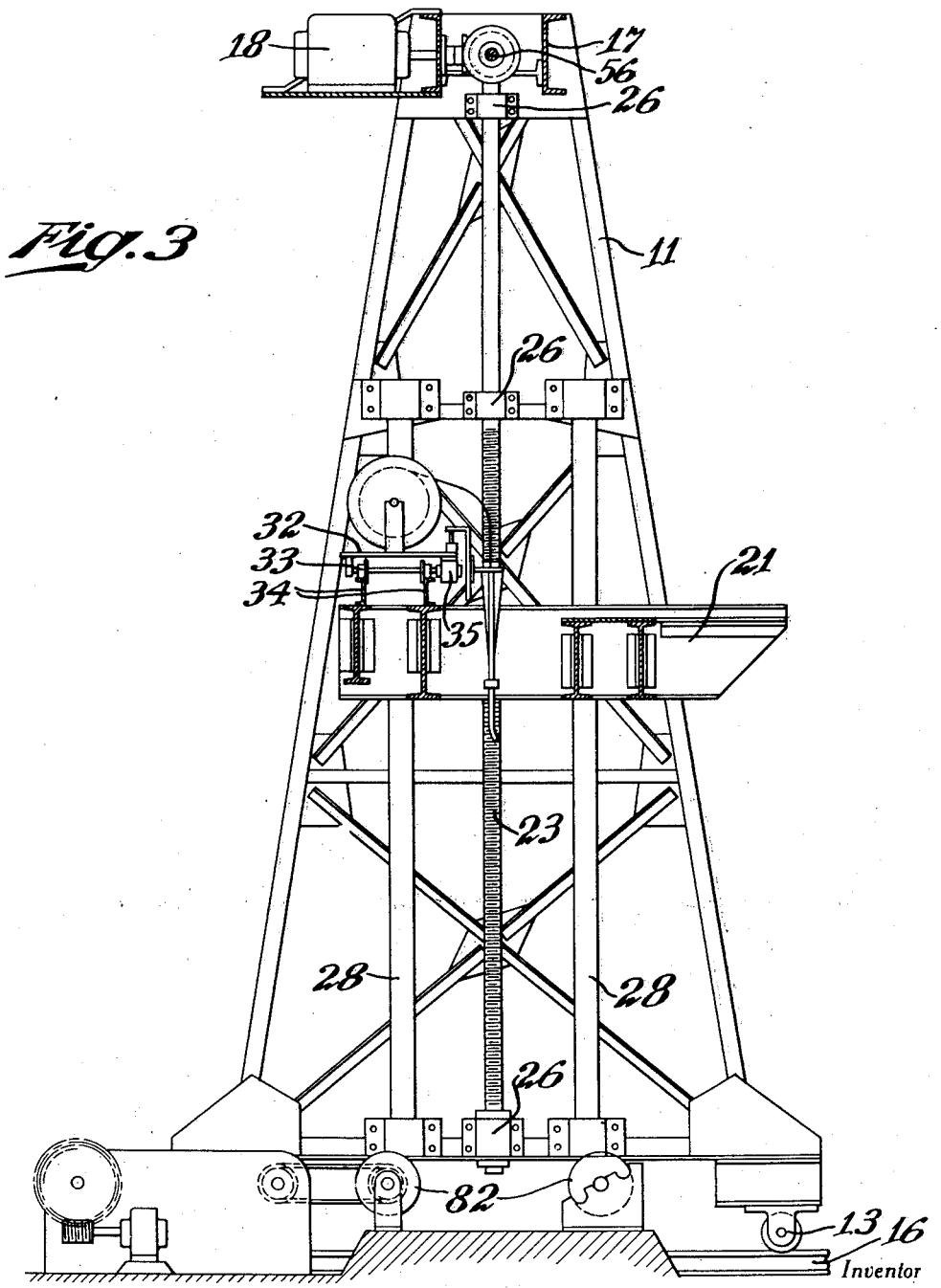

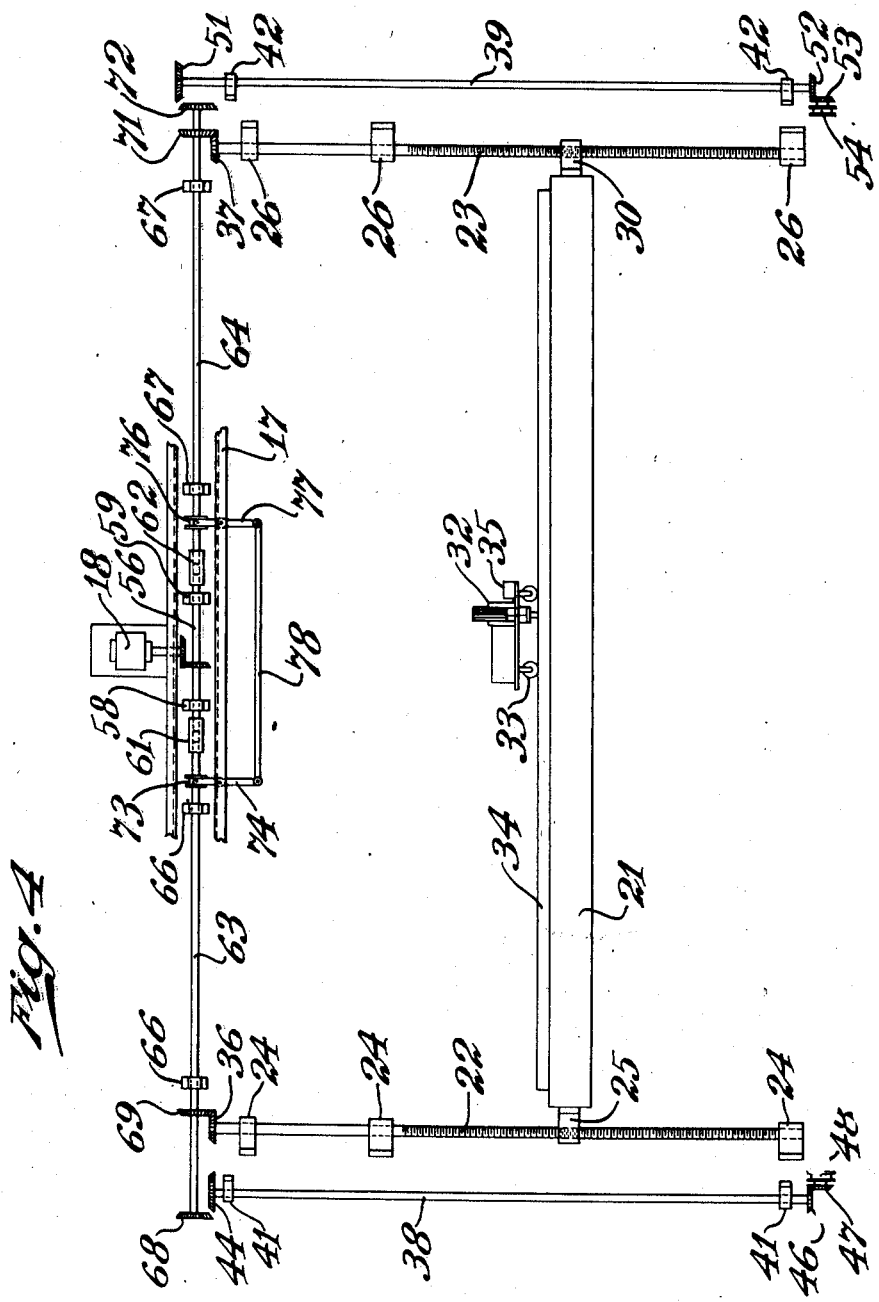

Patented Dec. 17, 1929

1,740,117

UNITED STATES PATENT OFFICE

CHARLES C. PINCKNEY, OF BIRMINGHAM, ALABAMA, ASSIGNOR TO BIRMINGHAM TANK COMPANY, A CORPORATION OF DELAWARE

WELDING APPARATUS

Application filed November 28, 1927. Serial No. 236,206.

My invention relates to autogenous welding apparatus and has for its object the provision of apparatus of the character designated which shall be adapted for use in the manufacture of a wide variety of structures and which shall be extremely flexible in operation, thereby greatly reducing the labor incident to such use.

A further object of my invention is to provide welding apparatus particularly adapted for use in the manufacture of cylindrical structures, such as tanks, and which shall be capable of use with such structures over a wide range of sizes.

A still further object of my invention is to provide welding apparatus embodying novel supporting means whereby the apparatus may be moved vertically, longitudinally and transversely with respect to the material to be welded and which shall include power actuated means for selectively accomplishing the required movement.

In my application, Serial No. 211,396, filed August 8, 1927, and assigned to the Birmingham Tank Company, there is shown, described and claimed autogenous welding apparatus particularly adapted for use in the manufacture of cylindrical tanks. The apparatus shown in the aforesaid application includes supporting structure for the welding machine and power means for moving the welding machine clear of the structure which is being welded. Means are also provided for moving the welding machine longitudinally with respect to the apparatus being welded, and power actuated means are provided for moving the material being welded relative to the welding machine. While the apparatus described has proved very efficient in performing the work for which it was designated, it is limited in its field of application to cylindrical structures within a small range of diameters. It is the particular object of this invention to enlarge the field of usefulness of apparatus such as described in the previous application, and to make it adaptable for use in welding cylindrical structures over a wide range of sizes as well as adapting it for use in welding structures other than cylindrical.

In accordance with the present invention, I employ the well known gantry crane having power actuated means for moving it along a system of parallel tracks. Supported by, and spanning the crane is a platform which, in turn, supports the welding apparatus. The welding apparatus is movable longitudinally of the platform so as to traverse the work beneath it. Included in the supporting means for the platform, at each end thereof, is a screw hoist by means of which the platform may be raised or lowered to accommodate structures to be welded of different sizes. I thus afford welding apparatus which may be readily moved in three directions with respect to the work to be done, thereby providing flexibility of operation, and reducing the labor incident to carrying on the work.

Apparatus embodying features of my invention is illustrated in the accompanying drawing forming a part of this application; wherein Fig. 1 is a side elevation showing the apparatus in association with a system of power operated rollers and a cylindrical tank mounted on the rollers for welding;

Fig. 2 is an end elevation of the apparatus showing the means employed for driving the crane along its system of tracks;

Fig. 3 is a sectional view taken along the line III—III of Fig. 1; and

Fig. 4 is a diagrammatic view showing the power means employed for driving the crane and raising and lowering the working platform.

Referring to the drawing, I show a gantry crane embodying structural end members 10 and 11 supported on trucks 12 and 13 which run on a system of parallel tracks 14 and 16. Spanning the end members 10 and 11, at the top thereof, is a bridge 17 carrying a reversible motor 18, which latter is adapted, in a manner to be more particularly described, to drive trucks 12 and 13 so as to shift the crane along the tracks 14 and 16.

Spanning the end members 10 and 11, beneath the bridge 17, is a working platform 21, supported at its ends by vertically extending screw members 22 and 23. The screw members 22 and 23 are carried in bearings 24 and 26 attached to the end members 10 and 11 and extend through threaded lugs 25 and 30 secured to the ends of the platform 21. In order to prevent tilting of the working platform 21, two pairs of guides 27 and 28 are provided adjacent the screw members 22 and 23 and secured to the end members 10 and 11. Suitable sleeves 29 and 31, carried by the working platform 21, fit over the guides 27 and 28 and thus hold the working platform in a horizontal position. An electric welding machine 32 supported by trucks 33, riding on longitudinal tracks 34, is mounted on the working platform 21 so as to be movable along the platform from end to end thereof. The trucks 33 are suitably connected for being driven along the tracks 34 by a motor 35.

The welding machine 32, as illustrated in the drawing, is that of a well known manufacture, and forms no part of my invention. It is therefore not described in detail. Any other suitable welding machine might be employed to good advantage with my improved apparatus for adapting the machine to the work to be accomplished.

The screw members 22 and 23 extend upwardly to the bridge 17 and carry beveled gears 36 and 37 at their upper ends. Extending downwardly of the end members 10 and 11 are shafts 38 and 39 carried in bearings 41 and 42 secured to the end members. The shaft 38 is provided at its top, adjacent the beveled gear 36, with a gear 44 and at its bottom with a gear 46 which latter meshes with a gear 47 carried by a driving wheel 48 of the truck 12. The shaft 39 is likewise provided, at its top, with a beveled gear 51 adjacent the gear 37 and at its bottom with a gear 52, the latter meshing with a gear 53 carried by a driving wheel 54 of the truck 13.

The motor 18 is geared to drive a power shaft 56 mounted in bearings 58 and 59 on the bridge 17. Carried by the shaft 56 are two sleeves 61 and 62 to which are splined power transmitting shafts 63 and 64, respectively, so that said shafts are movable longitudinally with respect to the sleeves 61 and 62. The shafts 63 and 64 are mounted in suitable bearings 66 and 67 on the bridge 17. On the outer end of the shaft 63 are a pair of beveled gears 68 and 69 adapted to mesh with either the gear 44 or the gear 36 as may be desired. At the outer end of the shaft 64 are a pair of beveled gears 71 and 72 adapted to mesh with either the gear 37 or the gear 51. Carried by the shaft 63 is a collar 73 and mounted on the bridge 17 is a shifting fork 74 to bring the gears 68 and 69 selectively into mesh with the gear 44 or the gear 36. The shaft 64 is likewise provided with a collar 76 and a shifting form 77, mounted on the bridge 17, which fork is adapted to coact with the collar 76 to bring the gears 71 and 72 selectively into mesh with the gear 37 or the gear 51. In order to operate the shafts 63 and 64, with their gears, in unison, the shifting forks 74 and 77 are coupled by means of a rod 78.

From the foregoing description, the operation of apparatus made in accordance with my invention will be readily understood. Whenever it is desired to raise or lower the working platform 21 and the welding apparatus 32, the shafts 63 and 64 are shifted to bring the gears 69 and 71 in mesh with the gears 36 and 37 so as to rotate the screw members 22 and 23 in the threaded lugs 25 and 30 and the motor 18 is run in the appropriate direction to raise or lower the platform. This provides means for adjusting the apparatus vertically to different sizes of apparatus being manufactured. Should it be desired to move the apparatus along the tracks 14 and 16 to bring it in proper position with respect to work being done, the shafts 63 and 64 are shifted to bring the gears 68 and 72 into mesh with the gears 44 and 51 so as to rotate the driving wheels 48 and 54 and the motor 18 is run in the appropriate direction to move the apparatus in the direction desired.

As may be seen in Fig. 1, the apparatus is particularly adapted for the welding of cylindrical tanks such as 81. The tank 81 is mounted on a system of power operated rollers 82 so as to be rotated beneath the welding apparatus 32 to do circumferential welding thereon, while the welding apparatus 32 is moved along the platform 21 to do longitudinal welding thereon. The feature described whereby the platform 21 may be readily raised and lowered makes my improved apparatus readily adaptable for welding tanks from relatively small to relatively large diameters. Furthermore, the feature described permitting movement of the apparatus along the tracks 12 and 13 adapt it for use in welding articles of various sizes and shapes including seams extending transversely to the direction of movement of the welding apparatus 32 on the platform 21.

From the foregoing it will be apparent that I have devised an improved welding apparatus of great flexibility and which is simple of design and operation.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A means for positioning a welding machine comprising a platform along which the machine is longitudinally movable, supporting means for the platform and movable transversely of the direction of movement of the welding machine on the platform, means to raise and lower the platform in the supporting means, power actuated means for moving the supporting means and for raising and lowering the platform, and a selective transmission operable by the power means to raise or lower the platform or move the supporting means.

2. In apparatus for positioning a welding machine, a platform supporting the machine, said welding machine being movable longitudinally of the platform, a hoist for raising and lowering the platform to bring the welding machine to proper elevation with respect to material to be welded, supporting structure for the hoist, a track for the supporting structure and extending in a direction transverse to the direction of movement of the welding machine on the platform, and power means for selectively moving the supporting structure along the track or for operating the hoist.

3. Apparatus for positioning a welding machine comprising a platform supporting the machine, said welding machine being movable longitudinally of the platform, power means for moving the welding machine on the platform, a hoist for raising and lowering the platform to bring the welding machine to proper elevation with respect to material to be welded, supporting structure for the hoist, a track for the supporting structure and extending in a direction transverse to the direction of movement of the welding machine on the platform, and power means for selectively moving the supporting structure along the track or for operating the hoist.

4. Apparatus for positioning a welding machine comprising a platform along which the machine is longitudinally movable for supporting the machine, a screw hoist for raising and lowering the platform, supporting structure for the screw hoist, a track for the supporting structure and extending in a direction transverse to the direction of movement of the welding machine on the platform, power actuated means for operating the screw hoist and for moving the supporting structure along the track, and means for shifting the power actuated means to operate the hoist or move the supporting structure.

5. Apparatus for positioning a welding machine comprising a supporting platform, longitudinally extending tracks on the platform, trucks on the welding machine riding on the tracks, power means for operating the trucks, a screw hoist for raising and lowering the platform, supporting structure for the screw hoist, a track for the supporting structure and extending in a direction transverse to the direction of movement of the welding machine on the platform, power actuated means for operating the screw hoist and for moving the supporting structure along the track, and means for shifting the power actuated means to operate the hoist or move the supporting structure.

6. Apparatus for positioning a welding machine comprising a gantry crane, a system of parallel tracks on which the crane is mounted, power actuated means for driving the crane along said tracks, a platform spanning the crane and supported thereby, means for mounting the welding machine for longitudinal movement on the platform, means carried by the crane at each end of the platform for raising and lowering the platform, and means for connecting and disconnecting the power actuated means to selectively drive the crane along its tracks or operate the raising and lowering means.

7. In apparatus for positioning a welding machine with respect to material to be welded, a gantry crane having structural end members with trucks supported on a system of parallel tracks and a bridge connecting the end members, a platform spanning the members beneath the bridge, a welding machine being carried by the platform and being movable longitudinally thereof, a screw hoist at each end of the platform and carried by the structural members for raising and lowering the platform, separate gear means for operating the hoist and the trucks, a motor mounted on the bridge, a shaft driven by the motor, gears carried by the shaft, and means for shifting the gears to selectively mesh with either of said gear means.

8. In apparatus for positioning a welding machine with respect to material to be welded, a gantry crane including end members movably supported on wheels on a system of parallel tracks, a bridge spanning the end members at the top and a shaft with gears extending downwardly from the bridge at each end to drive the wheels on the tracks, a platform spanning the end members beneath the bridge, welding apparatus being carried by the platform and being movable longitudinally thereof, a screw hoist for raising and lowering the platform including screw shafts extending upwardly to the bridge and provided on their upper ends with gears, other gears adapted to mesh with either the gears for driving the wheels on the tracks or with the gears on the screw shafts, means for shifting the other gears, and reversible power means for driving said other gears.

9. In apparatus for positioning a welding machine with respect to material to be welded, a gantry crane including end members movably supported on wheels on a system of parallel tracks, a bridge spanning the end members at the top and a shaft with gears extending downwardly from the bridge at each end to drive the wheels on the tracks, a platform spanning the end members beneath the bridge, a screw hoist for raising and lowering the platform including screw shafts extending upwardly to the bridge and provided on their upper ends with gears, other gears adapted to mesh with either the gears for driving the wheels on the tracks or with the gears on the screw shafts, means for shifting the other gears, and reversible power means for driving said other gears, there being autogenous welding machine mounted on the platform and longitudinally movable thereof.

In testimony whereof I, CHARLES C. PINCKNEY, affix my signature.

CHARLES C. PINCKNEY.